US012757939B2

(12) United States Patent
Li et al.

(10) Patent No.: US 12,757,939 B2
(45) Date of Patent: Oct. 13, 2026

(54) AEROSOL GENERATION APPARATUS AND SUSCEPTOR

(71) Applicant: SHENZHEN FIRST UNION TECHNOLOGY CO., LTD., Shenzhen City (CN)

(72) Inventors: Junhui Li, Shenzhen City (CN); Zhongli Xu, Shenzhen City (CN); Yonghai Li, Shenzhen City (CN)

(73) Assignee: SHENZHEN FIRST UNION TECHNOLOGY CO., LTD., Shenzhen City (CN)

( * ) Notice: Subject to any disclaimer, the term of this patent is extended or adjusted under 35 U.S.C. 154(b) by 505 days.

(21) Appl. No.: 17/918,126

(22) PCT Filed: Apr. 12, 2021

(86) PCT No.: PCT/CN2021/086435
§ 371 (c)(1),
(2) Date: Oct. 11, 2022

(87) PCT Pub. No.: WO2021/204286
PCT Pub. Date: Oct. 14, 2021

(65) Prior Publication Data

US 2023/0136305 A1 May 4, 2023

(30) Foreign Application Priority Data

Apr. 11, 2020 (CN) ......................... 202010281797.2

(51) Int. Cl.
*H05B 6/06* (2006.01)
*A24F 40/20* (2020.01)
(Continued)

(52) U.S. Cl.
CPC ........... *A24F 40/465* (2020.01); *H05B 6/105* (2013.01)

(58) Field of Classification Search
CPC ........ A24F 40/46; A24F 40/465; H05B 6/105
See application file for complete search history.

(56) References Cited

U.S. PATENT DOCUMENTS

2018/0192701 A1 7/2018 Stoner
2018/0279681 A1 10/2018 Rojo-Calderon et al.
(Continued)

FOREIGN PATENT DOCUMENTS

CN 106255429 A 12/2016
CN 107920602 A 4/2018
(Continued)

OTHER PUBLICATIONS

First Office Action dated Feb. 15, 2025 received in Chinese Patent Application No. 202010281797.2.
(Continued)

*Primary Examiner* — Philip Y Louie
*Assistant Examiner* — Charlotte Davison
(74) *Attorney, Agent, or Firm* — Scully, Scott, Murphy & Presser, P.C.

(57) ABSTRACT

An aerosol generation apparatus and a susceptor are provided. The aerosol generation apparatus includes a cavity for receiving a smokable material, and the susceptor at least partially extending along the axial direction of the cavity, when the smokable material is received within the cavity in use, the susceptor is inserted into the smokable material for heating; the susceptor includes an avoidance portion and a heating portion sequentially provided along the direction close to a proximal end; the size of at least a part of the avoidance portion along the cross-sectional direction of the cavity is less than that of the heating portion, such that a certain gap is retained between the susceptor and the smokable material, when the susceptor is inserted into the smokable material.

19 Claims, 4 Drawing Sheets

(51) Int. Cl.

| | |
|---|---|
| ***A24F 40/40*** | (2020.01) |
| ***A24F 40/46*** | (2020.01) |
| ***A24F 40/465*** | (2020.01) |
| ***H05B 6/10*** | (2006.01) |

(56) References Cited

U.S. PATENT DOCUMENTS

| | | | | |
|---|---|---|---|---|
| 2019/0208813 | A1* | 7/2019 | Rojo-Calderon ........ | A24D 1/20 |
| 2019/0364973 | A1 | 12/2019 | Kaufman et al. | |
| 2019/0380391 | A1* | 12/2019 | Reevell ................. | A24F 40/465 |
| 2021/0084980 | A1* | 3/2021 | Lee ........................ | H05B 6/108 |

FOREIGN PATENT DOCUMENTS

| | | | | | |
|---|---|---|---|---|---|
| CN | 110325058 | A | | 10/2019 | |
| CN | 110771959 | A | | 2/2020 | |
| CN | 110891441 | A | | 3/2020 | |
| CN | 110913713 | A | | 3/2020 | |
| CN | 210203367 | U | | 3/2020 | |
| CN | 110996696 | A | | 4/2020 | |
| EP | 3469936 | A2 | | 4/2019 | |
| EP | 3469936 | A3 | | 7/2019 | |
| KR | 10-2029225 | B1 | | 10/2019 | |
| WO | 2019/030000 | A1 | | 2/2019 | |
| WO | WO-2019030172 | A1 | * | 2/2019 | ........... A24F 40/465 |
| WO | WO-2019030360 | A1 | * | 2/2019 | ........... A24F 40/465 |
| WO | 2019/238814 | A1 | | 12/2019 | |
| WO | WO-2020180126 | A2 | * | 9/2020 | ............. A24F 40/70 |
| WO | WO-2021125561 | A1 | * | 6/2021 | ............. A24F 40/46 |

OTHER PUBLICATIONS

European search report dated Aug. 29, 2023 received in European Patent Application No. 21784823.3

Office Action dated Sep. 8, 2023 received in European Patent Application No. 21784823.3.

Office Action dated Jun. 12, 2025 received in European Patent Application No. 21784823.3.

* cited by examiner

AEROSOL GENERATION APPARATUS AND SUSCEPTOR

CROSS-REFERENCE TO RELATED APPLICATIONS

The present application is a 35 U.S.C. § 371 National Phase conversion of International (PCT) Patent Application No. PCT/CN2021/086435, filed on Apr. 12, 2021, which claims priority to the Chinese Patent Application No. 202010281797.2, filed on Apr. 11, 2020 and entitled "AEROSOL GENERATION APPARATUS AND SUSCEPTOR", which is incorporated herein by reference in its entirety. The PCT International Patent Application was filed and published in Chinese.

TECHNICAL FIELD

Embodiments of the present application relate to the technical field of heat-not-burnt smoking sets, and in particular relate to an aerosol generation apparatus and a susceptor.

BACKGROUND

Smoking articles (e.g., cigarettes, cigars, etc.) burn tobacco during use to produce tobacco smoke. Attempts have been made to replace these articles that burn tobacco by making products that release compounds without burning.

Examples of such products are heating apparatuses, which release compounds by heating, rather than burning materials. For example, the material may be tobacco or other non-tobacco products, and the non-tobacco products may or may not contain nicotine. In an existing heating apparatus example, the tobacco product is heated by an electromagnetic induction heating method, where an induction heating element, which is penetrated by a magnetic field to generate heat, is typically made of stainless iron or permalloy material with excellent magnetic permeability. The structure of the heating apparatus is shown in FIG. 1, when a smoking article 1 is received within the heating apparatus, a susceptor 2 is penetrated by an alternating magnetic field generated by an induction coil 3 to generate heat in an induction manner, thereby heating the smoking article 1. As shown in FIG. 1, the shape of the susceptor 2 may be a needle-like or a blade-like structure, which can be inserted into a cigarette 1 received within the apparatus for heating. When in use, the entire part, inserted into the cigarette 1, of the susceptor 2 is in contact with tobacco shred of the cigarette 1, such that the tobacco shred within the length range in contact with the susceptor 2 is heated to form relatively brittle slag, and when the cigarette 1 is removed from the heating apparatus, the slag falls into the apparatus and pollutes the apparatus.

SUMMARY

In order to solve the problem that in the prior art, a needle-type or blade-shaped susceptor is inserted into a cigarette to heat the cigarette, which causes slag falling, embodiments of the present application provide an aerosol generation apparatus capable of reducing slag falling and a susceptor.

The aerosol generation apparatus provided by the present application is used for heating a smokable material to generate an aerosol and includes:

a cavity, configured to receive the smokable material, and having a proximal end and a distal end opposite to each other along the axial direction;

a magnetic field generator, configured to generate a varying magnetic field; and a susceptor, configured to be penetrated by the varying magnetic field to generate heat, and configured to at least partially extend from the distal end to the proximal end along the axial direction of the cavity, and then inserted into the smokable material for heating when the smokable material is received within the cavity in use;

where the susceptor includes an avoidance portion and a heating portion sequentially provided along the direction close to the proximal end; and the size of at least a part of the avoidance portion along the cross-sectional direction of the cavity is less than the size of the heating portion along the cross-sectional direction of the cavity, such that a certain gap is kept between the avoidance portion and the smokable material when the susceptor is inserted into the smokable material.

In a preferred embodiment, the extension length of the avoidance portion along the axial direction is 1-5 mm.

In a preferred embodiment, the size of at least a part of the avoidance portion along the cross-sectional direction of the cavity is 1-3 mm less than the size of the heating portion along the cross-sectional direction of the cavity.

In a preferred embodiment, the size of the heating portion along the cross-sectional direction of the cavity is substantially constant.

In a preferred embodiment, the size of the avoidance portion along the cross-sectional direction of the cavity is substantially constant.

In a preferred embodiment, the size of the avoidance portion along the cross-sectional direction of the cavity gradually increases along the direction close to the heating portion.

In a preferred embodiment, an accommodating cavity extending along the axial direction is provided within the susceptor, and a temperature sensor for sensing a temperature of the susceptor is accommodated or packaged within the accommodating cavity.

In a preferred embodiment, the susceptor further includes a base portion, and the heating portion and the avoidance portion are retained within the cavity by means of the base portion.

In a preferred embodiment, the avoidance portion and the heating portion are configured to be in a sheet shape extending along the axial direction of the cavity, and the size of the avoidance portion along the width direction is less than the size of the heating portion along the width direction, such that the gap is formed between the avoidance portion and the smokable material along the width direction of the susceptor when at least a part of the susceptor is inserted into the smokable material.

In a preferred embodiment, the avoidance portion at the distal end of the cavity is flush with a surface of the distal end of the cavity.

The present application further provides a susceptor for an aerosol generation apparatus, for being inserted into a smokable material received within the aerosol generation apparatus for heating, where the susceptor includes a heating portion and an avoidance portion sequentially provided along the length direction, and the size of at least a part of the avoidance portion along the cross-sectional direction of the cavity is less than the size of the heating portion along the cross-sectional direction of the cavity, such that a certain gap is retained between the avoidance portion and the smokable material when the susceptor is inserted into the smokable material.

When the aerosol generation apparatus and the susceptor are in use, the front end, inserted into the cavity, of the smokable material is less heated without forming scorch or brittle slag and has a better physical form, such that when the smokable material is removed from the cavity, tobacco slag falling out from the inside can be retained and blocked, reducing falling of the tobacco slag and keeping the cavity and the susceptor clean.

BRIEF DESCRIPTION OF DRAWINGS

One or more embodiments are illustrated by pictures in the corresponding accompanying drawings, which are not intended to limit the embodiments, in which elements having the same reference numerals represent similar elements, and the figures of the accompanying drawings are not intended to constitute a scale limitation unless specifically stated otherwise.

DETAILED DESCRIPTION

To facilitate the understanding of the present application, the present application will be described in more detail below with reference to the accompanying drawings and specific embodiments.

Figure 1:
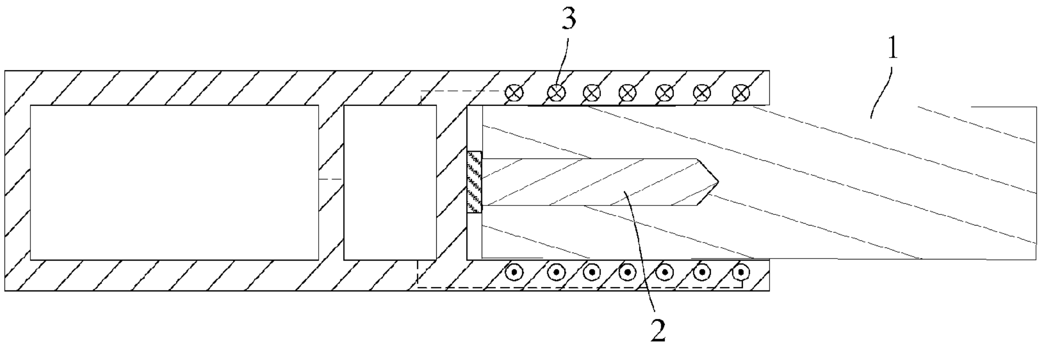
FIG. 1 (Prior Art)
FIG. 1 is a schematic diagram of an electromagnetic induction heating apparatus in the prior art.
Figure 2:
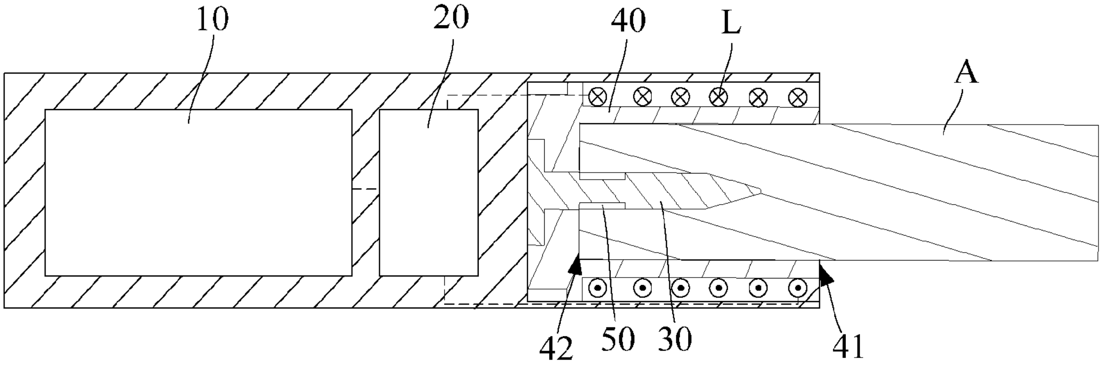
FIG. 2 is a schematic structural diagram of an aerosol generation apparatus according to an embodiment.

An embodiment of the present application provides an aerosol generation apparatus, and the configuration of which is shown in FIG. 2, including:

- a cavity, within which a smokable material A such as a cigarette is removably received;
- an inductance coil L, used as a magnetic field generator and configured to generate an alternating magnetic field under alternating current;
- a susceptor 30, at least a part of which extends within the cavity, and configured to be inductively coupled to the induction coil L, and penetrated by the alternating magnetic field to generate heat, so as to heat the smokable material A to volatilize at least one component of the smokable material A to form an aerosol for smoking;
- a battery cell 10, which is a rechargeable direct-current battery cell and can provide direct voltage and direct current; and
- a circuit 20, electrically connected to the rechargeable battery cell 10, and configured to convert the direct current output by the battery cell 10 into the alternating current with a suitable frequency, and then supply the same to the inductance coil L.

In implementation, the smokable material A may be one or more smoking materials including powder, granules, pellets, shreds, strands, strips or sheets wrapped by an outer wrapper, e.g., wrapping paper, specifically including: one or more of grass leaves, tobacco leaves, main vein of tobacco, expanded tobacco, homogenized tobacco, and glycerin as an aerosol generation agent, such that a smokable aerosol can be generated when heated.

Depending on the configuration in product use, the inductance coil L may include a cylindrical inductor coil wound into a spiral, as shown in FIG. 2. The cylindrical inductance coil L wound into a spiral may have a radius r within the range of about 5 mm to about 10 mm, and particularly the radius r may be about 7 mm. The length of the cylindrical inductance coil L wound into a spiral may be within the range of about 8 mm to about 14 mm, and the number of turns of the inductance coil L is within the range of about 8 turns to 15 turns. Accordingly, the inner volume may be within the range of about 0.15 $cm^3$ to about 1.10 $cm^3$.

In a more preferred embodiment, the frequency of an alternating current supplied to the inductance coil L by the circuit 20 is between 80 KHz and 400 KHz; more specifically, the frequency may be within the range of about 200 KHz to 300 KHz.

In a preferred embodiment, the battery cell 10 provides a direct current supply voltage within the range of about 2.5 V to about 9.0 V, and the battery cell 10 can provide a direct current with the amperage within the range of about 2.5 A to about 20 A.

In the embodiment shown in FIG. 2, the aerosol generation apparatus further includes a tubular bracket 40 for configuring the induction coil L and the susceptor 30. As shown in FIG. 2, the tubular bracket 40 may be made of a high temperature resistant non-metallic material such as PEEK or ceramic. In implementation, at least a part of the inner space of the tubular bracket 40 forms a cavity for receiving the smokable material A, while the induction coil L is arranged on the outer wall of the tubular bracket 40 in a spirally winding manner.

Furthermore, according to the preferred embodiment illustrated in FIG. 2, the cavity formed by a tubular hollow of the tubular bracket 40 has a proximal end 41 and a distal end 42 opposite to each other along the axial direction. The proximal end 41 is configured to be open, facilitating receipt and removal of the smokable material A. The distal end 42 is a closed end for the smokable material A to abut against so as to provide a stop for the smokable material A, while the susceptor 30 extends from the distal end 42 to the proximal end 41.

Figure 3:
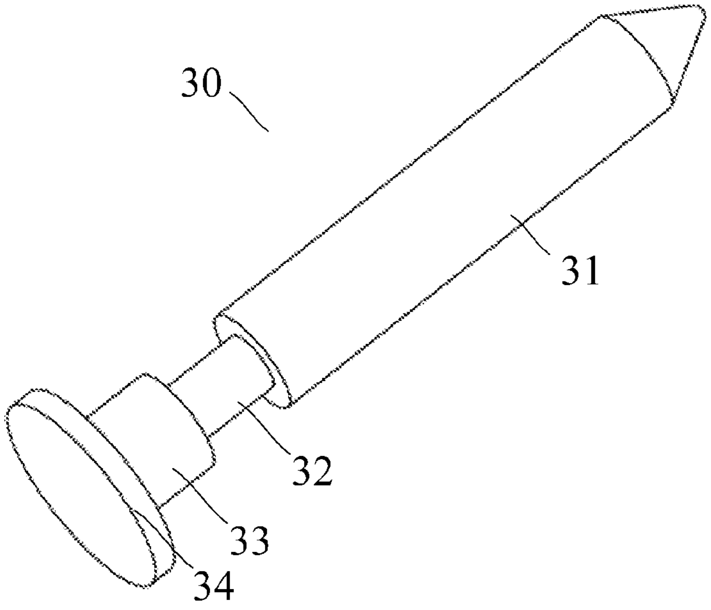
FIG. 3 is a schematic structural diagram of a susceptor in FIG. 2.

Furthermore, the configuration of the susceptor 30 can be seen in FIG. 2 and FIG. 3, substantially in the shape of a needle or pin configured to at least partially extend along the axial direction of the cavity. In implementation, the entire susceptor 30 may have a length within the range of about 12-18 mm, and an outer diameter of about 2.5-5 mm. In detail, the susceptor includes, in sequence along the axial direction:

- a heating portion 31, located within the cavity after assembly and used for being inserted into the smokable material A for heating; and
- an avoidance portion 32, located within the cavity after assembly, having an outer diameter less than the heating portion 31, capable of keeping a certain gap 50 with the smokable material A and thus in a non-contact state when being inserted into the smokable material A along with the heating portion 31 in use. Therefore, the part, in contact with the heating portion 31, of the smokable material A can be heated more through contact transfer, and the part corresponding to the avoidance portion 32 can be heated less, preventing the part of the front end of the smokable material A from being heated to form scorch or brittle solid slag. Consequently, after smoking is completed, the part of the front end of the smokable material A has a better form and is substantially unattached to the susceptor 30, which can reduce the falling of tobacco slag or fragments when the smokable material A is removed from the cavity and thus separated from the susceptor 30.

Certainly, furthermore, according to FIG. 2, the distal end 42 of the cavity after installation is configured to allow the smokable material to abut against and provide a stop, such that the avoidance portion 32 at the distal end 42 is flush with a surface of the distal end 42 of the cavity in implementation.

Based on an optional embodiment, it is optional to configure the length of the avoidance portion 32 to be about 1-5 mm, and the outer diameter of the same to be 1-3 mm less than the outer diameter of the heating portion 31.

Furthermore, referring to FIG. 2 and FIG. 3, to facilitate installation and fixation of the susceptor 30 within the tubular bracket 40, the susceptor 30 further includes:

a first base portion 33, and a second base portion 34 having an outer diameter greater than that of the first base portion 33. When in use, a retaining cavity which fixes and retains the susceptor 30 by abutting against the second base portion 34 is correspondingly provided within the tubular bracket 40, thereby enabling the susceptor 30 to be stably mounted in the tubular bracket 40. In light of convenience in use, the size of the outer diameter of the second base portion 34 is relatively greater than that of the heating portion 31.

In terms of functional design, the outer diameter of the heating portion 31 is substantially constant to ensure that the heating portion 31 of the susceptor 30 can be sufficiently in contact with the smokable material A when inserted into the same, thereby sufficiently performing heat conduction. On the basis of being able to form the gap 50, the outer diameter of the avoidance portion 32 may be inconstant.

Figure 4:
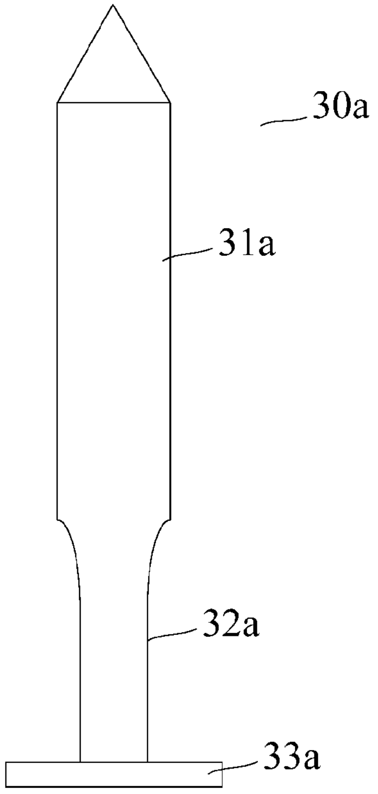
FIG. 4 is a schematic structural diagram of a susceptor according to another embodiment.

For example, the configuration of a susceptor 30*a* according to another variant embodiment is shown in FIG. 4, the part, close to a heating portion 31*a*, of an avoidance portion 32*a* is configured to have a shape with a gradually increasing outer diameter, such that the surface thereof is a slantingly cambered surface or the like, and lower frictional resistance with the susceptor 30*a* is caused when the smokable material A is removed, promoting the smokable material A to be more smoothly separated from the susceptor 30*a* and thus reducing falling of tobacco slag. The base portion 33*a* is configured to assist in the installation and fixation of the susceptor 30*a*.

Figure 5:
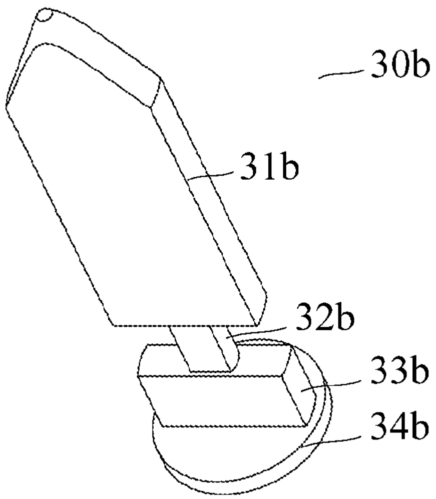
FIG. 5 is a schematic structural diagram of a susceptor according to another embodiment.

In another variant embodiment shown in FIG. 5, the entire and a heating portion 31*b* of a susceptor 30*b* are configured to be generally blade-like, thereby having a larger surface area for contact with the smokable material A and transfer of heat to the same. Specifically, the avoidance portion 32*b* is formed by notches which are provided inwardly on both sides of the susceptor 30*b* along the width direction. Meanwhile, in order to facilitate installation, a first base portion 33*b* and a second base portion 34*b* with different outer diameters are further provided, which can facilitate abutting and fixation after installation.

Figure 6:
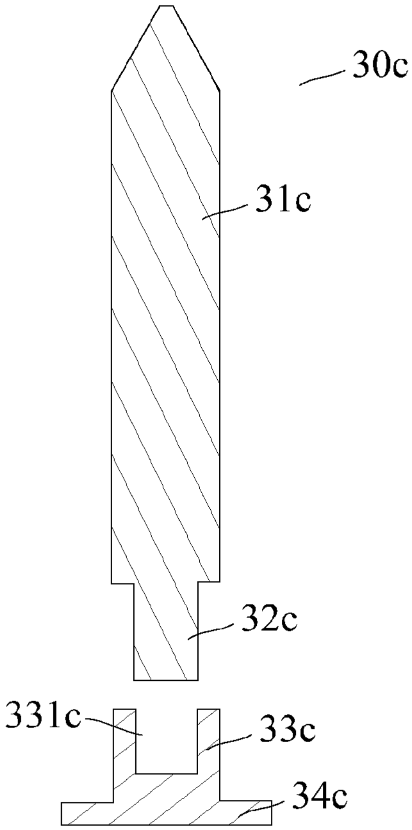
FIG. 6 is a schematic structural diagram of a susceptor according to another embodiment.

In light of the convenience of production and replacement, the configuration of a susceptor 30*c* according to another optional embodiment shown in FIG. 6 is composed of two parts spliced, and specifically, includes:

a heating portion 31*c* and an avoidance portion 32*c*, which can be made of metal materials with proper magnetic permeability, such as permalloy and stainless iron, which can be penetrated by a magnetic field to generate heat; and a first base portion 33*c* and a second base portion 34*c*, which specifically may be made of a low thermal conductivity material, e.g., an oxidized ceramic, an alumina ceramic or an organic polymer material, such that after the susceptor 30*c* is assembled into the tubular bracket 40, heat conduction can be minimized to prevent thermal damage to the tubular bracket 40; where the first base portion 33*c* is provided with a slot 331*c*, and at least a part of the avoidance portion 32*c* is inserted into the slot 331*c* and then is tightly fit or fixed into a whole during assembly. Certainly, the extension length of the slot 311*c* is less than the length of the avoidance portion 32*c*, and after assembly, a part of the avoidance portion 32*c* is still exposed to form the above gap 50 in use.

Figure 7:
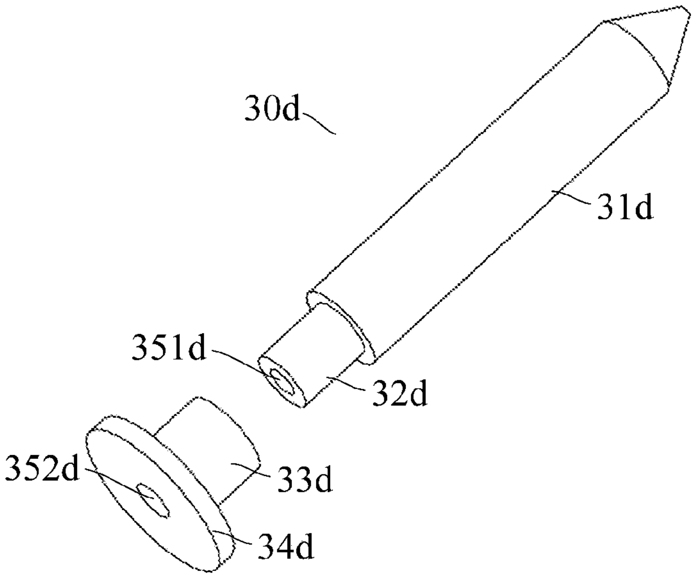
FIG. 7 is a schematic structural diagram of a susceptor according to another embodiment.
Figure 8:
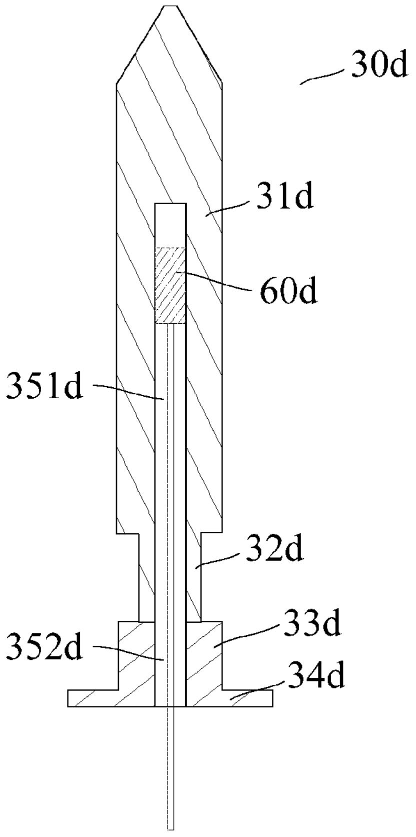
FIG. 8 is a schematic diagram of a temperature sensor packaged within the susceptor in FIG. 7.

In another optional embodiment shown in FIG. 7 and FIG. 8, a susceptor 30*d* is internally provided with an accommodating cavity extending along the axial direction. The accommodating cavity is provided with a first portion 351*d* extending along the axial direction of a heating portion 31*d* and an avoidance portion 32*d*, and a second portion 352*d* extending along the axial direction of a first base portion 33*d* and a second base portion 34*d*. When in use, a temperature sensor 60*d* for sensing a temperature of the susceptor 30*d* is packaged within the accommodating cavity, and the temperature sensor 60*d* is tightly attached to the inner wall of the heating portion 31*d* in a gluing manner or the like so as to sense a heating temperature. Certainly, conductive pins of the temperature sensor 60*d* can extend out of the second base portion 34*d* to facilitate connection of the temperature sensor 60*d* to a circuit 20, and facilitate the supply of power to the temperature sensor 60*d* and receipt of sensing signals.

In use of the above aerosol generation apparatus, within the range of about several millimeters of the front end, inserted into the cavity, of the smokable material A, the smokable material A is not in contact with the susceptor 30 and has a gap about several millimeters therebetween, such that the part of the front end, inserted into the cavity, of the smokable material A is less heated, does not form scorch or brittle slag, and has a better physical form. When the smokable material A is removed from the cavity after smoking, tobacco slag falling out from the inside can be retained and blocked, keeping the cavity and the susceptor clean.

It should be noted that the preferred embodiments of the present application are given in the description and the accompanying drawings of the present application, but are not limited to the embodiments described in the description, and furthermore, for those of ordinary skill in the art, improvements or transformations can be made according to the above description, and all these improvements and transformations should fall within the protection scope of the appended claims of the present application.

What is claimed is:

1. An aerosol generation apparatus, for heating a smokable material to generate an aerosol, comprising:

a cavity, configured to receive the smokable material, and having a proximal end and a distal end opposite to each other along an axial direction of the cavity;

a magnetic field generator, configured to generate a varying magnetic field; and a susceptor, configured to be penetrated by the varying magnetic field to generate heat, and configured to at least partially extend from the distal end to the proximal end along the axial direction of the cavity, and then inserted into the smokable material for heating when the smokable material is received within the cavity from the proximal end in use;

wherein the susceptor comprises an avoidance portion and a heating portion sequentially provided along the axial direction toward the proximal end; and a size of at least a part of the avoidance portion along a cross-sectional direction of the cavity is less than a size of the heating portion along the cross-sectional direction of the cavity, such that a gap is kept between the avoidance portion and the smokable material when the susceptor is inserted into the smokable material, wherein the magnetic field generator surrounds the avoidance portion of the susceptor.

2. The aerosol generation apparatus according to claim 1, wherein an extension length of the avoidance portion along the axial direction is 1-5 mm.

3. The aerosol generation apparatus according to claim 2, wherein the size of the heating portion along the cross-sectional direction of the cavity is constant.

4. The aerosol generation apparatus according to claim 2, wherein the size of the avoidance portion along the cross-sectional direction of the cavity is constant.

5. The aerosol generation apparatus according to claim 2, wherein the size of the avoidance portion along the cross-sectional direction of the cavity gradually increases along the axial direction toward the heating portion.

6. The aerosol generation apparatus according to claim 2, wherein an accommodating cavity extending along the axial direction is provided within the susceptor, and a temperature sensor for sensing a temperature of the susceptor is accommodated or packaged within the accommodating cavity.

7. The aerosol generation apparatus according to claim 2, wherein the susceptor further comprises a base portion, and the heating portion and the avoidance portion are retained within the cavity by means of the base portion.

8. The aerosol generation apparatus according to claim 2, wherein the avoidance portion and the heating portion are configured to be in a sheet shape extending along the axial direction of the cavity, and a size of the avoidance portion along a width direction of the susceptor is less than a size of the heating portion along the width direction, such that the gap is formed between the avoidance portion and the smokable material along the width direction of the susceptor when at least a part of the susceptor is inserted into the smokable material.

9. The aerosol generation apparatus according to claim 2, wherein the avoidance portion at the distal end of the cavity is flush with a surface of the distal end of the cavity.

10. The aerosol generation apparatus according to claim 1, wherein the size of at least a part of the avoidance portion along the cross-sectional direction of the cavity is 1-3 mm less than the size of the heating portion along the cross-sectional direction of the cavity.

11. The aerosol generation apparatus according to claim 1, wherein the size of the heating portion along the cross-sectional direction of the cavity is constant.

12. The aerosol generation apparatus according to claim 1, wherein the size of the avoidance portion along the cross-sectional direction of the cavity is constant.

13. The aerosol generation apparatus according to claim 1, wherein the size of the avoidance portion along the cross-sectional direction of the cavity gradually increases along the axial direction toward the heating portion.

14. The aerosol generation apparatus according to claim 1, wherein an accommodating cavity extending along the axial direction is provided within the susceptor, and a temperature sensor for sensing a temperature of the susceptor is accommodated or packaged within the accommodating cavity.

15. The aerosol generation apparatus according to claim 1, wherein the susceptor further comprises a base portion, and the heating portion and the avoidance portion are retained within the cavity by means of the base portion.

16. The aerosol generation apparatus according to claim 1, wherein the avoidance portion and the heating portion are configured to be in a sheet shape extending along the axial direction of the cavity, and a size of the avoidance portion along a width direction of the susceptor is less than a size of the heating portion along the width direction, such that the gap is formed between the avoidance portion and the smokable material along the width direction of the susceptor when at least a part of the susceptor is inserted into the smokable material.

17. The aerosol generation apparatus according to claim 1, wherein the avoidance portion at the distal end of the cavity is flush with a surface of the distal end of the cavity.

18. The aerosol generation apparatus according to claim 1, wherein the susceptor further comprises a first base portion, and a second base portion having an outer diameter greater than an outer diameter of the first base portion, and greater than an outer diameter of the heating portion, the first base portion is configured to fix the susceptor within the cavity.

19. The aerosol generation apparatus according to claim 18, wherein the first and second base portions are integrally formed and configured to be an integrally separated part from the heating portion and the avoidance portion, and at least a part of the avoidance portion having a length less than a whole length of the avoidance portion is inserted within the first base portion so that the first and second base portions, the avoidance portion and the heating portion are assembled together as the susceptor.

* * * * *